United States Patent Office 3,261,900
Patented July 19, 1966

3,261,900
METHOD FOR ENHANCING THE CLARITY AND GLOSS OF POLYETHYLENE FILM
Frank W. Spillers, Freeport, Tex., assignor to The Dow Chemical Company, Midland, Mich., a corporation of Delaware
No Drawing. Filed Oct. 24, 1962, Ser. No. 232,873
3 Claims. (Cl. 264—140)

This invention relates to a process for improving the properties of solid polymers, and more particularly such polymers of ethylene.

Solid ethylene polymers may be broadly classified into two main types, i.e., linear polyethylene which has a density in the range of from 0.95 to 0.96, and high pressure polyethylene which has a density of from about 0.91 to 0.93. In general, the linear type will have a melt index in the range of from about 0.2 to 5, and the high pressure type will have a melt index of from about 0.2 to 40. Such polyethylenes are characterized by inherent flexibility, inertness to most environments, and by outstanding dielectric properties and, because of these properties they are particularly valuable for numerous applications. One such commercial application consists of film which is used in many ways, i.e., weather protection, decoration, packaging, etc.

When film is used in packaging, clarity becomes an extremely important physical property. Various methods have been proposed and utilized, including high temperature and pressure degradation, as well as repeated extrusion operations, to improve the clarity of such film.

The present invention represents an improvement over known methods of enhancing certain properties of solid polymers, such as improving clarity and gloss and lowering haze, slip and block characteristics. Briefly, the objects of the invention are attained by passing the polymer between adjacent rolls which are rotating at different speeds. The conditions under which such process is performed, form the basis of the subject invention.

The main object of the invention is to provide a process for improving certain physical properties of solid polymers.

A more specific object is to provide an improved process for enhancing certain properties of solid polymers such as improving clarity and gloss, and lowering haze, slip and block characteristics of said materials.

Another object is to improve the clarity of solid polymers in a rapid manner with a minimum amount of degradation of other physical properties.

These and further objects and features of the invention will become more apparent from the following description.

High pressure polyethylene can be prepared by methods known to the art wherein normally ethylene is under high pressure and temperature in the presence of free radical catalysts. Specific examples of commercially available polyethylene of this type are polyethylene sold by The Dow Chemical Company and designated by the numbers 510E (melt index 2.0, density 0.919), 550E (melt index 2.0, density 0.92), 710M (melt index 12.0, density 0.917), 990M (melt index 20.0, density 0.926) and 1000M (melt index 35.0, density 0.926).

Linear polyethylene can be prepared by methods known to the art wherein normally ethylene is polymerized at pressures and temperatures much lower than in the case of high pressure polyethylene in the presence of ionic catalysts. A specific example of commercially available polyethylene of this type is that available from The Dow Chemical Company under designation R401 (melt index 1.0, density 0.955).

As indicated hereinbefore, the polyethylene is admixed with an antioxidant, such as Ionol in the range of from about 0.01% to 0.1%, and is passed through two rough rolls. The rolls are arranged to operate at a speed ratio extending from 1/1 to 10/1 and higher, with the faster turning roll operating at speeds approaching 3,000 r.p.m. The rolls are best operated at a temperature of −70 degrees C. to the melting point of the polymer, with the minimum spacing between the peripheral surface of the rolls being in a range of from 1 to 5 mils.

The polyethylene is passed through the rolls in a monofilament form or pellets and exits from the rolls as a flat ribbon or flat pellets and thereafter is chopped to a flake, mixed with a metal salt of a saturated or unsaturated fatty acid, and finally granulated. The metal salt mentioned is of such acids having 12 to 24 carbon atoms in the acid radical such as lauric, oleic, stearic, ricinoleic, etc., wherein the metal is from groups I, II, III and IV of the periodic table, such as lead, copper, cadmium, calcium, aluminum, zinc, etc. Only minute amounts which remain compatible with the polymer need to be used, i.e., in the range of from about 0.05% to 3%.

As an example of the application of the principles of the invention, a high pressure polyethylene of density 0.921 and melt index 2 was admixed with "Ionol" (which is 2,6-di-tert.-butyl-p-cresol antioxidant) such that it contained 400 p.p.m. of this antioxidant. The polyethylene was then extruded into monofilaments with a 2½″ N.R.M. extruder maintained at 160 degrees C. and an extrusion rate of 120 lb. per hour. The monofilament produced was $80/1000$ thick. After reaching room temperature, these strands were passed through two adjacent rolls having a 4.27/1 ratio with the fast roll turning at 1700 feet per minute. After passing through the rolls which were spaced 4 mils apart, the polymer was chopped and admixed with 1% by weight of zinc stearate. Upon completion of the admixing, the polymer was reduced to granular form.

Film prepared from the polymer composition at the various stages in the process had the following properties:

|  | Clarity | Slip | Block | 20% Gloss | Gardner Haze |
|---|---|---|---|---|---|
| After 1st extrusion | 4.5/2.4 | 60 | 32 | 67/42 | 4.5 |
| After passing through rolls | 6.6/1.9 | 66 | 65.5 | 100/66 | 2.7 |
| After Zinc Stearate extrusion addition | 6.95/1.8 | 18 | 1 | 100/72 | 3.4 |

Film clarity and haze values indicated are as determined by the Gardner Hazemeter method (ASTM D1003-52, method A).

The slip values are determined by a test wherein stainless steel blocks of certain size (e.g., 4″ x 2½″ by ¾″) are placed one on top of the other with the films in face to face contact on a horizontal board. One end of the board is raised slowly until the upper block slides off the lower block. The angle of the board with the horizontal necessary to slide the upper block off the lower block is taken as the "slip" of the film.

Block value is the force in grams required to separate two films affixed to blocks (as used in the slip value test), when the force is applied normal to the plane of the films.

Other methods may be employed for determination of the criteria above discussed, it being obvious that the results of a series of tests made according to a standard procedure, are valid for comparative purposes. The tests described above, are, of course, known to those skilled in the art, and provide satisfactory results when consistently applied.

From the foregoing it will be apparent that the disclosed process will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A method for enhancing the clarity and gloss of polyethylene film while lowering haze, slip and block comprising admixing raw polyethylene with an antioxidant, of forming said admixed polyethylene into discrete shapes, passing said shapes through two adjacent rolls, said rolls operating at different peripheral speeds at a ratio between 1:1 to 10:1 and at a temperature between $-70°$ C. and the melting point of said polyethylene and with a spacing between the peripheral surface thereof to cause partial flattening of said discrete shapes, subsequently chopping said flattened shapes to produce smaller particles, then mixing said particles with 0.05 to 3% of a metal salt of a member of the group consisting of the saturated and the unsaturated fatty acids, granulating said mixture, and then forming plastic film therefrom.

2. The method of claim 1 wherein said discrete shapes of polyethylene are pellets.

3. The method of claim 1 wherein said discrete shapes of polyethylene are mono-filaments.

References Cited by the Examiner

UNITED STATES PATENTS

| 2,462,331 | 2/1949 | Myers | 264—175 |
| 2,586,820 | 2/1952 | Hemperly et al. | 264—175 |
| 2,920,349 | 1/1960 | White. | |
| 3,007,207 | 11/1961 | Salhofer | 264—175 |
| 3,030,330 | 4/1962 | Cines et al. | 264—349 |
| 3,036,340 | 5/1962 | Waddell | 264—294 |
| 3,165,505 | 1/1965 | Gaeth | 264—175 |

FOREIGN PATENTS

| 567,358 | 2/1945 | Great Britain. |

ALEXANDER H. BRODMERKEL, *Primary Examiner.*

A. L. LEAVITT, *Examiner.*

F. S. WHISENHUNT, *Assistant Examiner.*